H. W. RAVENSHAW.
MAGNETIC CLUTCH OR BRAKE.
APPLICATION FILED MAR. 17, 1908.
942,188.
Patented Dec. 7, 1909.
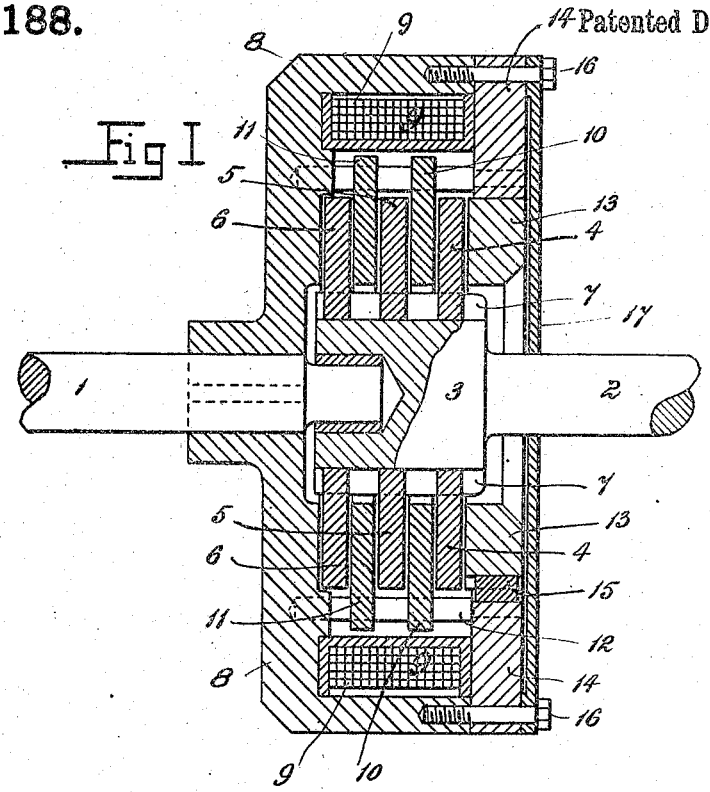
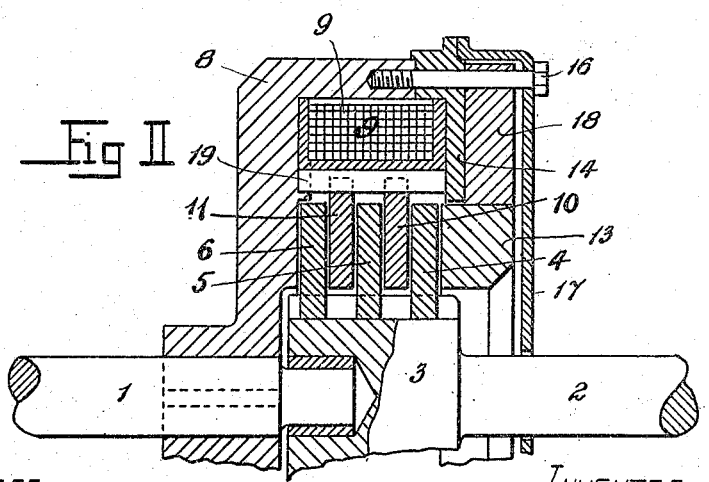
WITNESSES
INVENTOR
Henry Dillock Ravenshaw
by his attorneys
Lyons & Bissing

UNITED STATES PATENT OFFICE.

HENRY WILLOCK RAVENSHAW, OF HANWELL, ENGLAND.

MAGNETIC CLUTCH OR BRAKE.

942,188.  Specification of Letters Patent.  Patented Dec. 7, 1909.

Application filed March 17, 1908. Serial No. 421,637.

*To all whom it may concern:*

Be it known that I, HENRY WILLOCK RAVENSHAW, of Rutland House, Hanwell, in the county of Middlesex, England, have invented new and useful Improvements in Magnetic Clutches or Brakes, of which the following is a specification.

My invention relates to improvements in magnetic clutches or brakes of the same type (hereinafter termed the intermediate element type) as those set forth in the specifications filed in pursuance of my applications for Letters Patent, Serial No. 359,905, filed 28th February, 1907, and Serial No. 410,744, filed Jan. 14, 1908.

My present invention differs from that described in my patent specification last named mainly in that the magnetizing coil, instead of being placed inside the intermediate elements, is placed so as to surround the intermediate elements. By this means greater simplicity and economy of construction are obtained. The plates or intermediate elements may be made very light and therefore particularly suitable for motor cars. The invention is however applicable to a much wider range of field than motor cars. It is applicable for all purposes of clutches and brakes of the intermediate element type.

I shall now describe my invention with reference to the accompanying drawings in which—

Figure 1 is a central section of one form of my device and Fig. 2 a section of a modification.

Referring to Fig. 1 which illustrates a clutch constructed under my present invention and which is particularly applicable for motor cars I place the two shafts 1, 2, driving and driven, in alinement one of these shafts say the driven shaft 2 having a boss or extension piece 3 to which the slidably mounted intermediate elements 4, 5, 6 are attached by keys 7. The other shaft say the driving shaft 1 carries the annular, recessed electro-magnet 8 which contains in the recess the magnetizing coil 9 (slipped in from the right as the drawings show) and concentric with the coil and within it are also the other intermediate elements 10, 11 which are driven by the electro-magnet by means of driving pins 12 which pass through notches or holes in the said intermediate elements and thus cause said intermediate elements to coact peripherally with the annular electromagnet. The keeper 13 lies within an annular extension piece 14 of the electro-magnet. It is concentric with the said extension piece, is keyed thereto by the key 15 and it slides under the influence of magnetic attraction within the said extension piece. This extension piece forms part of the magnetic circuit and it is bolted to the electro-magnet proper by bolts 16 so that when removed ready access to the coil is obtained. The bolts which attach the extension piece to the electro-magnet proper may also serve to attach a plate or cover 17 for the purpose of excluding dirt.

In Fig. 2 I show a somewhat modified form of my clutch. Here I form the keeper in two concentric parts 13, 18 after the manner described in my patent specification Ser. No. 410,744 before mentioned the outer part 18 being free to slide on the bolts 16 and the inner part 13 sliding within the outer part 18. The annular extension piece 14 is made thinner than in the case of Fig. 1 and it is not in contact with the inner ring 13 of the keeper. By this means a better release is obtained. In this figure it will also be seen that the elements 10 and 11 are driven by keys 19 on the inside of the coil former instead of by driving pins as in Fig. 1.

It is to be understood that any convenient number of intermediate elements may be employed.

It will be noted that in the form of clutch described a hood as described in the patent specifications hereinbefore mentioned is unnecessary.

To enable the parts to open out when the electro-magnet is no longer energized separating springs may be employed if desired.

It will be seen that in my invention both the driving and the driven elements are included in the magnetic circuit and that therefore both of these elements are formed of or contain magnetic material.

Having thus described my invention what I claim as new and desire to secure by Letters Patent is:—

1. A magnetic clutch or brake comprising a driving and a driven shaft, a boss connecting the shafts, slidably mounted intermediate elements in part mounted on the boss, and a magnetizing coil surrounding the intermediate elements, substantially as described.

2. A magnetic clutch or brake comprising alined driving and driven shafts, a boss connecting the shafts, an annular, recessed electromagnet mounted on one of these shafts, a magnetizing coil contained in the recess, and intermediate elements located within the magnetizing coil which are secured to the driving and driven shafts respectively, one set of intermediate elements coacting peripherally with the annular electromagnet, the other directly with the boss on the shaft, substantially as described.

3. A magnetic clutch or brake comprising alined driving and driven shafts, an annular, recessed electromagnet mounted on one of the shafts, a magnetizing coil contained in the recess, an annular extension piece secured to the electromagnet, a keeper sliding within the annular extension piece, and intermediate elements, located within the coil, which are secured to the driving and driven shafts respectively and are operated by the keeper to couple the shafts, substantially as described.

4. A magnetic clutch or brake comprising alined driving and driven shafts, an annular, recessed electromagnet mounted on one of the shafts, a magnetizing coil contained in the recess, an annular extension piece secured to the electromagnet, a keeper formed of two concentric parts, and intermediate elements located within the coil, which are secured to the driving and driven shafts respectively and are operated by the keeper to couple the shafts, substantially as described.

5. A magnetic clutch or brake comprising alined driving and driven shafts, an annular, recessed electromagnet mounted on one of the shafts, a magnetizing coil contained in the recess, an annular extension piece secured to the electromagnet, a keeper formed of two concentric parts, a cover, and intermediate elements located within the coil which are secured to the driving and driven shafts respectively and are operated by the keeper to couple the shafts, substantially as described.

In witness whereof I have signed my name to this specification in the presence of two subscribing witnesses.

HENRY WILLOCK RAVENSHAW.

Witnesses:
F. L. RAND,
H. D. JAMESON.